United States Patent [19]
Burton et al.

[11] Patent Number: 5,214,971
[45] Date of Patent: Jun. 1, 1993

[54] ANGULAR ADJUSTMENT MECHANISM

[75] Inventors: John E. Burton, Ludington, Mich.; Thomas M. Witt, Lake Zurich, Ill.

[73] Assignee: Accurate Threaded Fasteners, Inc.

[21] Appl. No.: 854,378

[22] Filed: Mar. 19, 1992

[51] Int. Cl.⁵ .......................... B60Q 1/06; F16H 25/24
[52] U.S. Cl. ...................... 74/89.13; 74/89.15; 74/417; 74/459.5; 362/66
[58] Field of Search ............... 74/89.13, 89.15, 417, 74/459.5; 362/66

[56] References Cited

U.S. PATENT DOCUMENTS

| | | |
|---|---|---|
| 4,713,739 | 12/1987 | Ryder et al. ............... 362/69 X |
| 4,737,891 | 4/1988 | Burton ........................ 362/66 X |
| 4,893,219 | 1/1990 | Lisak ........................... 362/66 |
| 4,916,587 | 4/1990 | Hirose et al. ................ 362/66 |
| 4,939,945 | 7/1990 | Ryder et al. .............. 74/89.15 X |
| 5,079,676 | 1/1992 | Lisak .......................... 362/66 X |

Primary Examiner—Allan D. Herrmann
Attorney, Agent, or Firm—Laff, Whitesel, Conte & Saret

[57] ABSTRACT

An angular adjusting mechanism for a headlamp assembly having a rigid two piece press fit molded gear housing assembly. The housing accepts a pair of angularly disposed bevel gears including a drive shaft and drive gear with the drive shaft journaled in a bore in one of the housing sidewalls and the drive gear positioned within the housing and bearing on the interior of the housing sidewall. A tubular nut and an adjusting gear engaging said drive gear with the tubular nut journaled in a second sidewall bore and said nut telescopically accepting an elongated adjusting screw which is axially adjusted when the tubular nut is rotated by the adjusting gear.

30 Claims, 6 Drawing Sheets

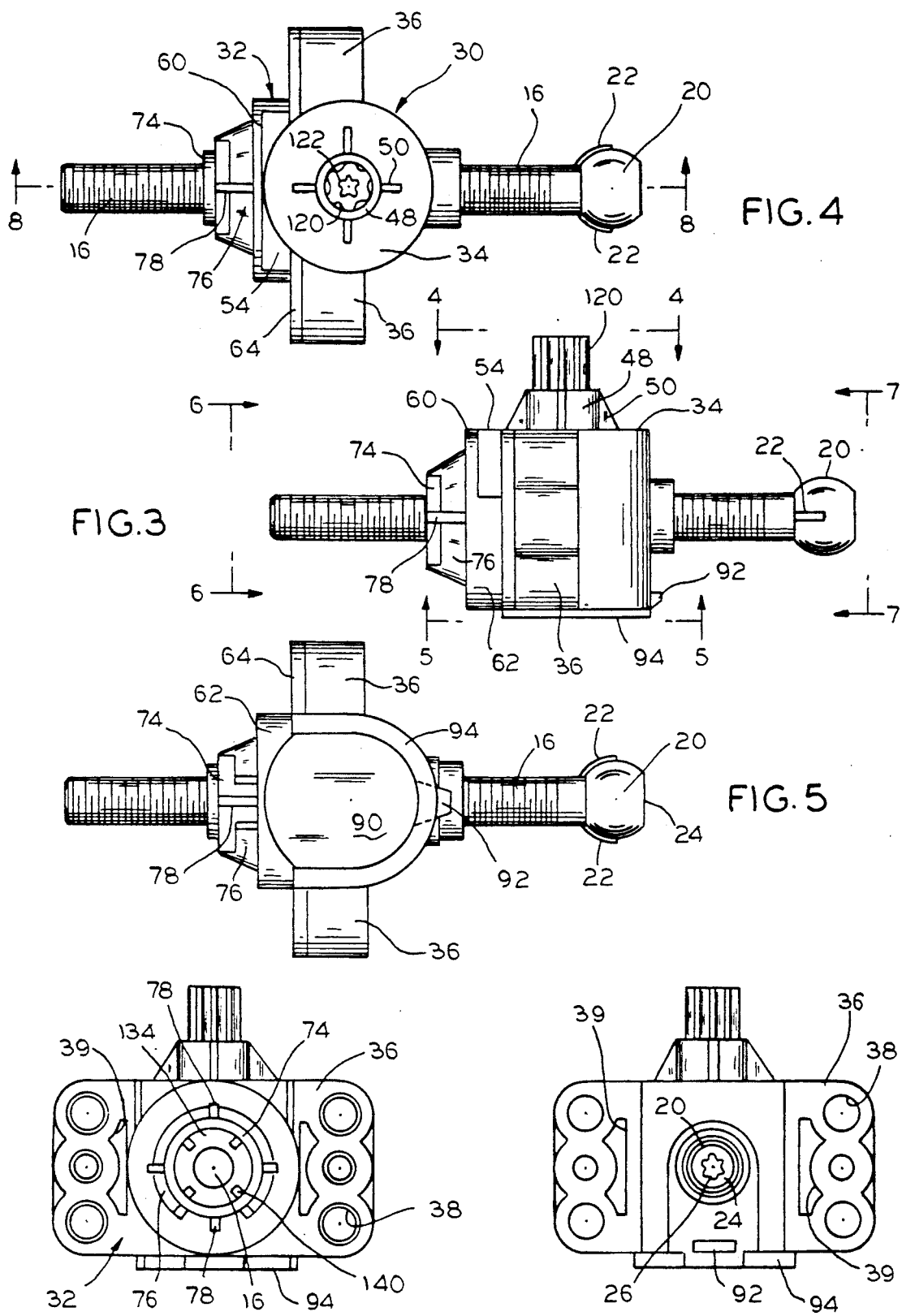

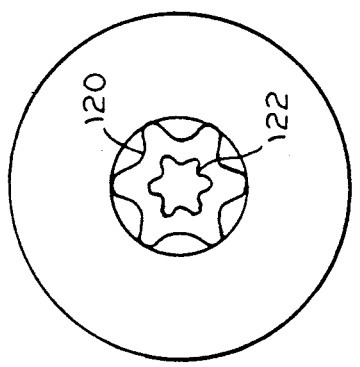
FIG.21
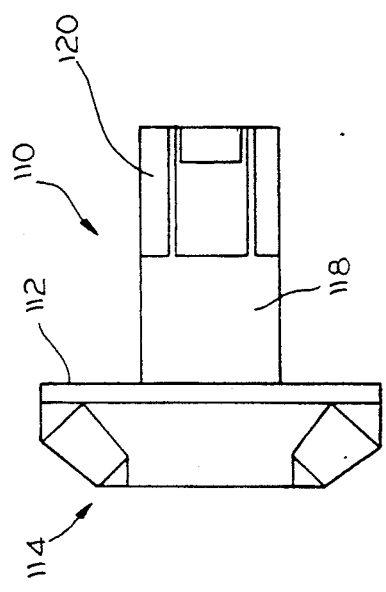
FIG.19
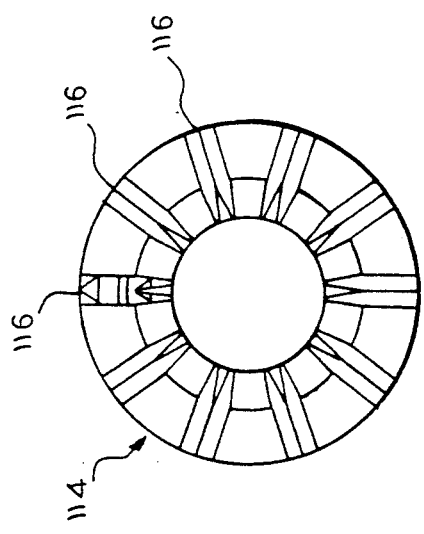
FIG.20
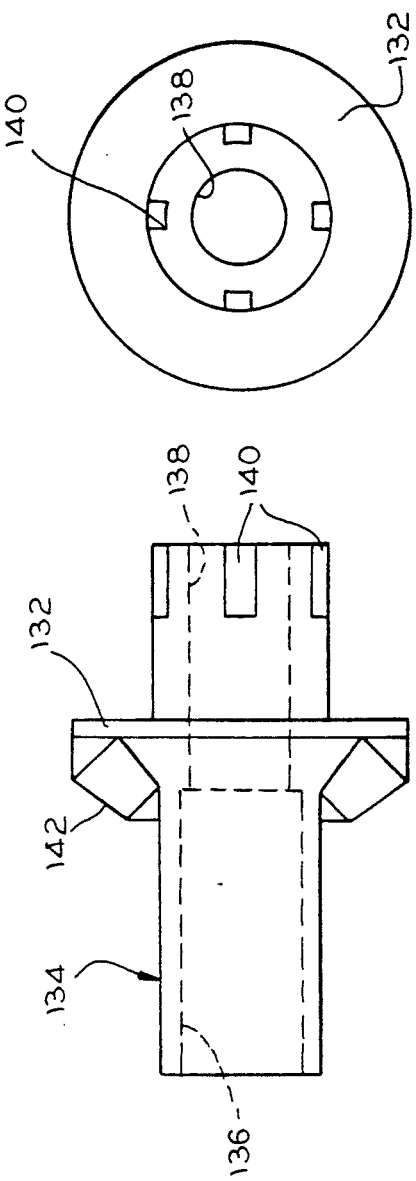
FIG.24
FIG.22
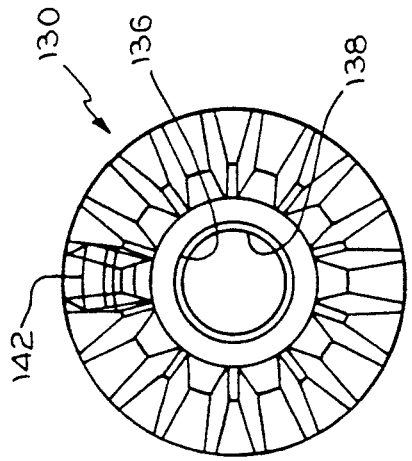
FIG.23

ANGULAR ADJUSTMENT MECHANISM

BACKGROUND OF THE INVENTION

The present invention relates to an angular adjustment mechanism for controlling linear movement along a first axis and rotary means disposed along a second axis angularly disposed to and intersecting the first axis, preferably at substantially a right angle, for actuating relatively light loads such as automobile headlight assemblies or the like. More particularly, the invention relates to an improved assembly and construction of such mechanisms when utilized for tilting headlight assemblies to bring about a change in the direction of the light beam.

As the design of headlights for vehicles, such as automobiles, has evolved, the headlights have adapted their exterior configuration to either be hidden by tiltable flaps which, when the lights are enclosed, serve to smooth the surrounding car surfaces to improve the aerodynamics of the front end of the car during non-use of the headlights. Other forms of headlights have been designed to have their lenses smoothly follow the contour of the grill and hood and to provide an aerodynamically efficient headlamp design. However, it is still necessary that means be provided to permit adjustment of the light beam to a predetermined direction so as to improve the safety of the vehicle in traffic by preventing unnecessary glare of the headlamp being directed toward oncoming vehicles.

Where the aerodynamic design of the vehicles is of paramount concern, it has been found that prior art adjusting means, which required access to adjusting means from the forward exterior of the vehicles, was not acceptable. Removal of trim to gain access to the adjusting means requiring specialized tools was unacceptable since the owner of the vehicle could not readily make the necessary adjustment without the assistance of a professional mechanic. Similarly, the utilization of openings to provide access to adjustment means through the grill or the hood resulted in undesirable whistling when confronted with the wind, as well as providing passages for accumulation of dirt and debris which clog up the access to the adjustment means.

Thus, such aerodynamically efficient headlamp designs have lead to modular designs requiring the headlamp adjusting mechanism to be located within the interior of the engine compartment so that the adjusting mechanism is easily accessible, whereby, headlamp realignment or adjustment would not require removal of any exterior bezels or trim and could be done expeditiously from the interior of the engine compartment. Examples of such interiorly accessible devices can be found in U.S. Pat. No. 4,737,891 to Burton (the same inventor and assignee as the present invention); U.S. Pat. No. 4,893,219 to Lisak; and U.S. Pat. No. 4,916,587 to Hirose et. al.

The patents to Lisak '219 and Hirose et. al. '587 disclose two forms of gear means for translating the rotary motion of a drive gear to the linear motion of the adjusting means acting on the headlamp assembly. More specifically, Hirose et. al. use a motor 77 with spur gears 80, 83 forming a reducing gear train driving the worm 81 which in turn drives the gear 86 causing ultimate linear motion in the adjusting means 47. Finite adjustment can be accomplished through a second gear set 21 and drive rod 42. A complex, detailed mechanism of great cost. On the other hand, the Lisak invention utilizes a plurality of parts including a so-called one-piece housing 22 having intersecting bores and recesses 24 and 26 with closure caps 38-39 that accommodate gears 32 and 34, in the recesses, with the latter gear 34 being assembled to and carried on nut member 34a while the former gear 32 is positioned on drive shaft 40 by the metallic retainer or springrip 42 which retains the shaft 40 totally within the recess 24 by acting on one of two caps, namely 39 and 38. The assembly of shaft 40 is a blind operation since it is impossible to see the orientation of the multi-lobular end 40a relative to multi-lobular opening 32a in the gear 32 when the shaft 40 is telescoped through the opening 39a of the cap 39. This also can lead to canting of the shaft when one of the lobular portions 40a contacts the fingers 42a of the springrip 42 causing the canting or non-coaxial introduction of shaft 40 into the aperture 39a in cap 39

The assembly and fastening of the caps 38 and 39 to the body 22 are expensive secondary operations that normally require either heat sealing or adhesive to maintain the caps in accurate assembled relation. Again, orientation of these elements during assembly introduces possible problems in orientation and rigidity in the assembly.

The problems enumerated above are eliminated by the teachings of the present invention which reduces the number of pieces used and the manner of assembly, thereby providing a new approach to solving the problems of manufacture in adjusting mechanisms as well as providing a superior more rigid structure that will insure proper orientation and mating of the gearset.

A secondary problem experienced by the prior art devices is the fact that when all of the gears are metallic in nature the cost of such gears is almost prohibitive in todays competitive marketplace. When all plastic gears are utilized it has been found that they do not have the necessary tooth shear strength to give adequate torque producing capabilities to overcome stuck headlamp frame assemblies that have been corroded by their environment. Where assemblies of plastic sleeve nuts, such as item 34a in Lisak '219, are assembled with adjustment gears 34 a further secondary operation expense is added to the entire adjustment mechanism.

SUMMARY OF THE INVENTION

In accordance with the present invention, an angular adjustment mechanism for a headlamp assembly, or the like, is provided with a rigid one piece molded main gear housing and a substantially rigid closure that can be press-fit assembled with finger-type pressure by mechanically sliding the housing and closure together. The assembly of these two parts provides a substantially rigid precision two piece housing for an axially restrained, but rotatable, lubricious tubular nut adapted to internally accept an axially moveable but rotatably restrained adjusting screw while the tubular nut is rotatably driven by an integrally carried adjusting gear. Such a tubular nut, preferably, has a stepped internal diameter.

A complimentary drive gear having an integral drive shaft is suitably journalled in a bore in the rigid main gear housing, with the shaft extending through that bore and out of the housing and provided with suitable drive impression means for connection to a mating drive shaft angularly disposed relative to the adjusting screw.

This housing design is unique in that it combines a simple two piece slidable press fit assembly without sacrificing rigidity and gear location, the absence of which are normally associated with multiple piece housings. Rigidity and gear location are critical to performance and gear strength in angular gear drives. Other housing designs, as pointed out above, that achieve adequate rigidity require extra pieces and a welding or adhesive operation that increases cost and allows for errors in alignment and improper gear location.

The gear set design of this adjustment means is unique in that it allows the use of an integral one-piece plastic gear and sleeve nut for maintaining the desired prevailing torque about the adjustment screw while providing lubricity when engaging with a metallic drive gear having a higher strength. This gives an overall higher gearset strength than that possible from a normally matched plastic to plastic gear set. This is achieved by decreasing the gear tooth width of the metallic drive gear while increasing the gear tooth width of the softer plastic driven adjustment gear so that a higher load balance is achieved and thus an overall higher gearset strength.

As will be amplified below, the metallic gear, having a greater shear strength in its teeth than the plastic gear teeth, utilizes a thinner tooth cross-section while the plastic gear utilizes a thicker tooth section measured circumferentially, or, normal to the axis of the pitch angle of the gear teeth. This configuration provides a balanced load on the teeth for the required torque generating capability, as well as the desired lubricity available from the plastic materials used in the adjustment gear that are not present in the metal-on-metal gear combinations that sometimes require some lubrication either at the time of manufacture or on periodic maintenance schedules. Unfortunately, most lubricants bring about a deleterious effect on plastic materials, hence, the present invention is a dramatic improvement. The thinner tooth section of the metallic gear also provides a weight saving feature.

The use of a rigid main housing provides both accurate alignment as well as accurate bearing surfaces for the backside of the gears, thereby insuring adequate support for proper mating in their designed loaded configuration. This accurate mating provides a longer life to the gear train design as well as more accurate adjustment.

BRIEF DESCRIPTION OF THE DRAWINGS

FIG. 3 is a side elevational view of the preferred embodiment ;

FIG. 4 is a top plan view taken along line 4—4 in FIG. 3;

FIG. 5 is a bottom plan view taken along line 5—5 in FIG. 3;

FIG. 6 is a left hand end view taken along line 6—6 in FIG. 3;

FIG. 7 is a right hand end view taken along line 7—7 in FIG. 3;

FIG. 19 is a side elevational view of the metallic drive gear and

FIG. 20 is the left hand end view of the metallic drive gear member forming a part of this invention;

FIG. 21 is the right hand end view of the metallic drive gear showing the drive engagement means at the free end of the stub shaft;

FIG. 22 is a side elevational view of the integral adjustment and tubular nut means;

FIG. 23 is the left hand end view of the plastic adjustment gear complemental to the drive gear; and FIG. 24 is the right hand or opposite end view of the integral plastic gear and tubular nut adjustment member.

DETAILED DESCRIPTION OF THE ILLUSTRATION EMBODIMENT

Figure 1:
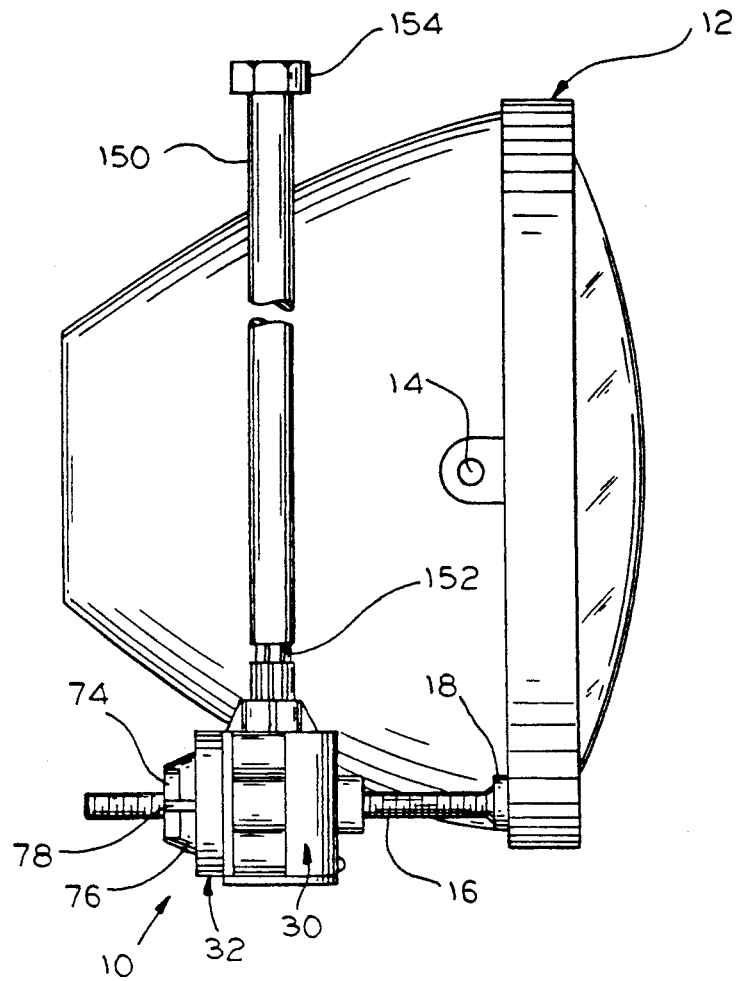
FIG. 1 is a side elevational schematic view of an adjusting mechanism of the present invention in conjunction with a simplistic schematic illustration of a headlamp assembly.
Figure 2:
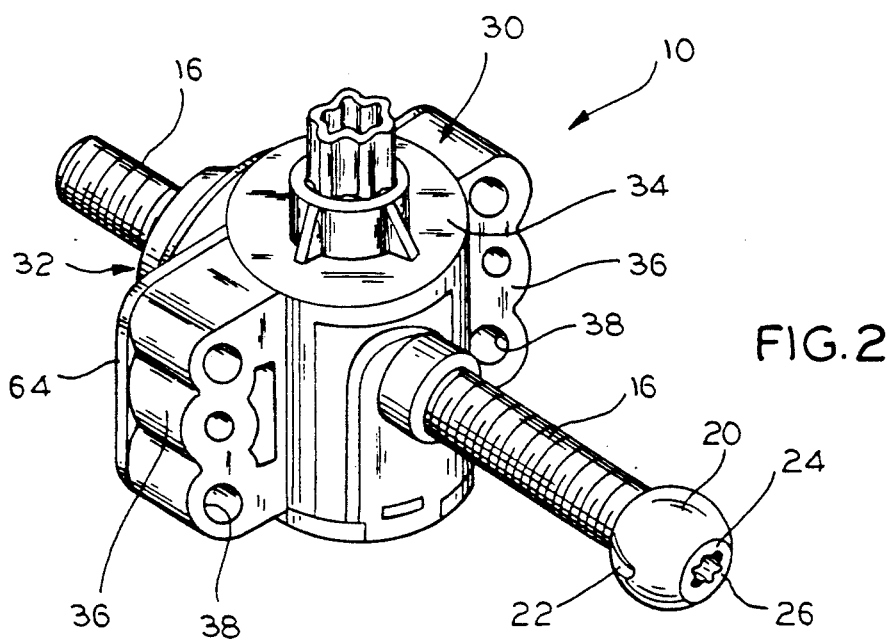
FIG. 2 is a perspective view of the preferred embodiment of the adjust mechanism of the present invention.

Referring now to the drawings, where similar parts will be designated by similar numerals, FIGS. 1 and 2 illustrate a preferred embodiment of the adjusting mechanism 10 contemplated by the present invention. FIG. 1 shows a schematic headlamp housing 12 and includes a horizontal pivot means 14 for up and down adjustments (at least one more pivot means, preferably vertical, not shown, and an additional adjustment mechanism 10, not shown, should be included to compensate for lateral adjustments if desired). An adjustment screw 16 extends through mechanism 10 and outwardly toward the retaining socket 18 affixed to housing 12. Adjustment screw 16 at one extremity carries an enlarged ball-like head 20 having at least one axially extending rib member 22 and a flattened free end 24 including an internal recessed drive means 26. The axial rib 22 cooperates with the socket 18 to prevent rotation of screw 16 so that rotation of an adjustment gear 130 and an integral sleeve nut 134 to be described in further detail hereinafter, will cause the screw 16 to be moved axially. The preferred drive means 26, utilized in the assembly of the screw 16 with the sleeve nut 134, is the patented drive impression sold under the Registered Trademark "Torx".

The adjustment means 10 includes a main body portion 30 and a back or cover portion 32. The main body portion 30 can be generally cylindrical shaped in external configuration as at 34 and includes a pair of laterally extending integral flange means 36 projecting laterally in opposite directions and having a plurality of through bores 38 for the acceptance of suitable fastening means such as screws to mount the adjustment means 10 on framework (not shown) of the headlamp housing 12, as amplified hereinafter. Elongated bores 39 may also be included as a means for weight reduction as well as a means for assisting in the molding operation, as is well known in the art.

For reference purposes in reading the specification, various full and sectional views of the "assembled" housing and gear members are generally shown in FIGS. 3 through 8, while "expanded" and "individual" views of the main body portion and the back or cover portion, plus the gear components, are found in FIGS. 9 through 24. Description of an individual figure will be equally applicable to the other views, unless specifically mentioned.

The one-piece integral main body portion 30 while being generally cylindrical in external configuration, as shown at upper end wall 34, in FIG. 4 the interior includes a pair of opposed flat bearing surfaces 40 joined by an adjacent connecting flat wall 42. The cylindrical design is merely one approach to giving adequate strength to the housing, in this case by use of hoop strength for such purposes, as well as weight and external projection reductions to permit its use in tighter quarters. A pair of bores 43 and 44, having intersecting axes, communicate through adjacent end wall 34 and sidewall 42 and are supported by bearing 46 and 48, respectively, with bearing 48 being reinforced by triangular braces 50 extending from upper end wall 34. At the back connecting flat wall 42, the bearing 54 is only a partial or upper segment of a cylindrical flange that is coaxial with opposed bearing 46 on the axis designated B. Segmented bearing 54 and its cooperative support will be described in fuller detail hereinafter. In the first described curved sidewall 42, which includes a planar chord 96 having bore 43 and bearing 46, also includes at the lower extremity thereof, as seen in the drawing, a slot 56, the function of which will be set forth below.

The segmented bearing 54 is supported and extends axially from the rear wall 42 that is the closure for the segmented cylindrical portion 98 extending flanges 36. Portion 98 includes varying radii from axis "B" to form axially extending radially disposed ridge lines 100, see FIG. 14, for cooperation with and support for portions of the back cover 32 to be described below.

Thus, the main body portion 30 provides an integral one-piece rigid member having positively oriented inner surfaces formed by top end wall 34, as seen in the FIGS. 3,4,8 and 9, and adjacent end walls 42. This important feature will be amplified upon hereinafter.

Referring now to FIGS. 8, 9, and 15 through 18, the back cover 32 includes, in the drawings, a vertically disposed generally circular shaped back wall 60 connected by a segment of a cylinder side wall 62 to a pair of laterally extending apertured flange means 64 whose apertures 66 are complimentary to through bores 38 in flanges 36. The segmented side wall 62 terminates with axially extending, generally radially disposed, upper edges 102, see FIGS. 15 and 17, that are complimentary to the ridge lines 100 and when assembled form a complete cylindrical configuration that is terminated and closed by the circular back wall 60. Wall 60 has a semicircular recess 82 complimentary to and capable of accepting semi-cylindrical bearing 54 which, in cooperation with the saddle-like semi-cylindrical extension 84, forms the bore 75 coaxial with opposed bore 43.

Extending outwardly from flanges 64 are a plurality of locating pins 70 complimentary to the blind bores 72 on the backside of flanges 36 in main body portion 30. These pins 70 and bores 72 also serve to absorb any shear forces along the juxtaposed surfaces of the flanges 64 and 36.

Figure 9:
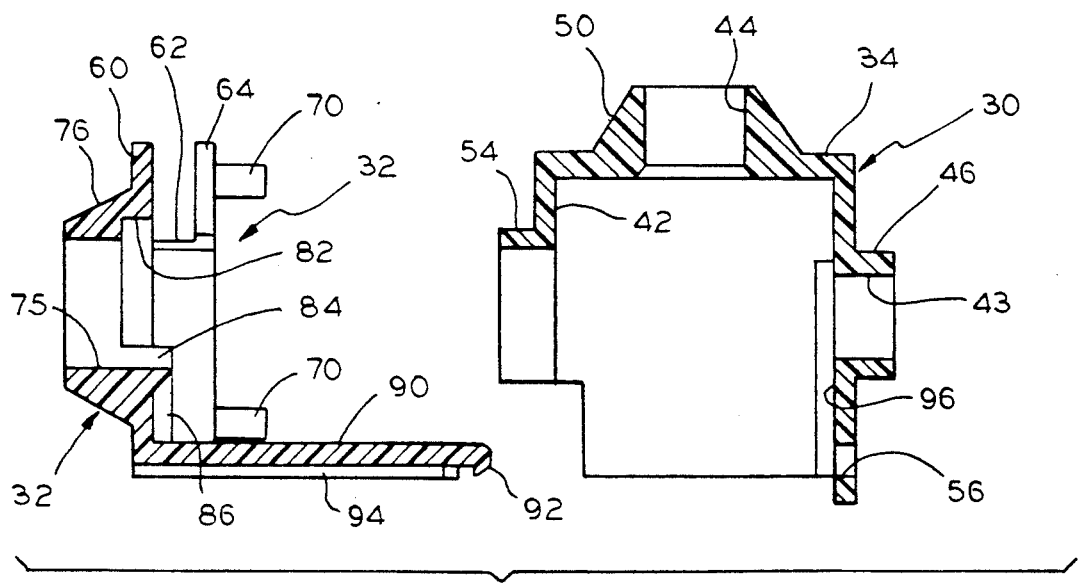
FIG. 9 is an exploded view in section of the two parts of the housing with the section for these parts taken along line 9—9 in FIG. 17 and line 9—9 in FIG. 12.
Figure 11:
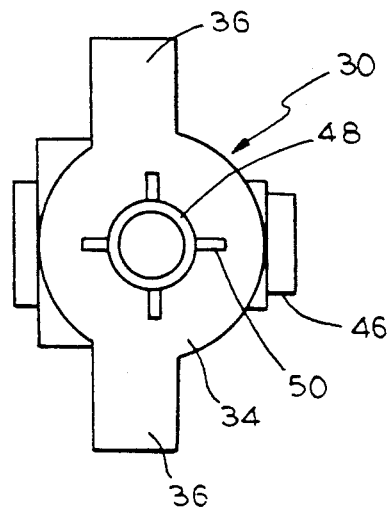
FIG. 11 a top plan view of the main housing.
Figure 10:
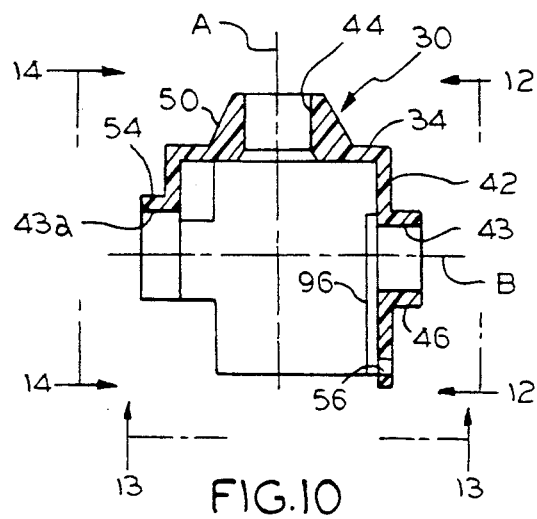
FIG. 10 is a sectional elevation of the main housing portion as taken along line 10—10 in FIG. 14.
Figure 12:
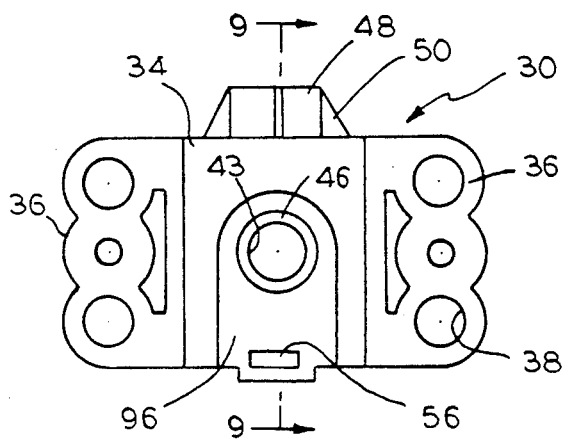
FIG. 12 is an end elevational view taken along line 12—12 in FIG. 10.
Figure 13:
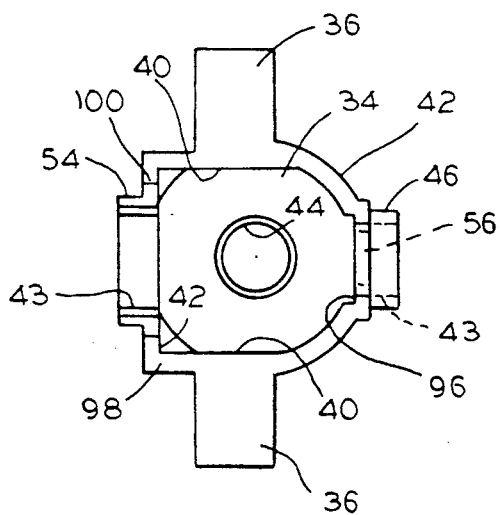
FIG. 13 is a bottom view of the main housing taken along line 13—13 in FIG. 10.
Figure 14:
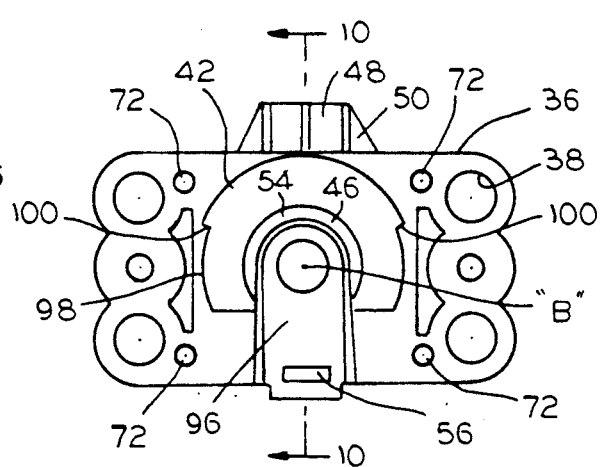
FIG. 14 is an opposite end view taken along line 14—14 in FIG. 10.
Figure 16:
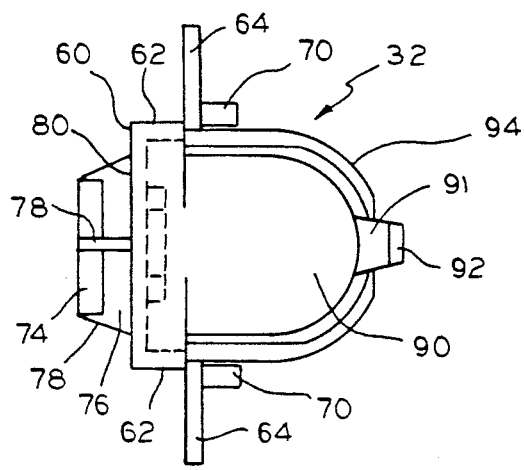
FIG. 16 is a bottom plan view of the cover portion of the housing as taken along line 16—16 of FIG. 15.
Figure 15:
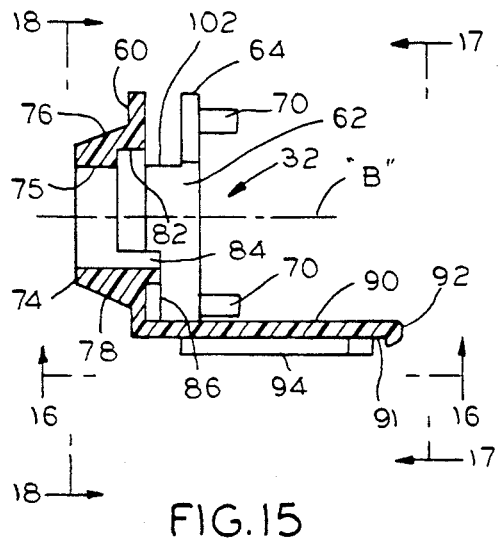
FIG. 15 is an elevational view in section of the cover portion of the housing, as taken along line 15—15 of FIG. 18.
Figure 17:
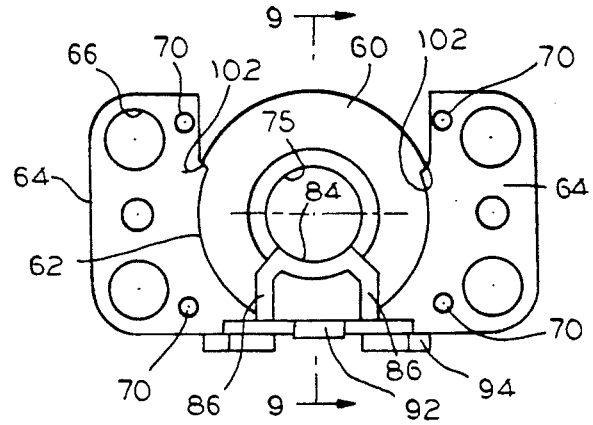
FIG. 17 an end elevational view taken along line 17—17 of FIG. 15.
Figure 18:
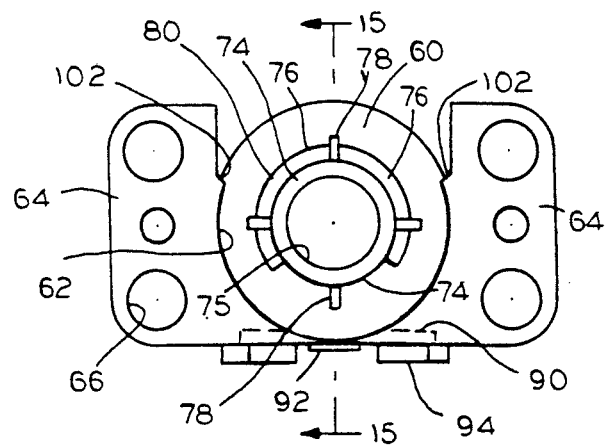
FIG. 18 is the opposite end elevational view taken along line 18—18 of 15.

The back wall 60 carries an nutwardly extending cylindrical bearing 74 forming bore 75 falling on axis B. Bearing 74 is reinforced by radial capered flanges 78 and an annular frusto-conical ring 76. Bore 7 is recessed as at 82 to accept the partial cylindrical bearing 54. The lower portion of bore 75, as best seen in FIGS. 9 and 17, is reinforced by a curved saddle-like cylindrical segment 84 that is supported by struts 86, with segment 84 being the complimentary to the missing segment from the partial bearing 54 and fulfilling and completing that bearing when later assembled therewith.

Extending outwardly from wall 64 in cantilever fashion is the bottom or closing wall 90 terminating in an axially extending tab 91 with hook 92. This lower wall 90 is reinforced by a perimeter flange means 94 and with the hook 92 being acceptable through slot 56 and locking on the outside surface of the reinforcing wall 96 to produce a unified assembly.

Fastening means, such as screw threaded means, can be introduced through one or more apertures 66 of flanges 64 to be accepted in one or more coaxial bores 38 in flanges 36. This fastening technique insures an additional positive assembly of body portions 30 and 32. Such screw threaded means reinforces the fastening provided by hook 92 with wall 96.

The internal mechanical elements utilized in this adjustment means assembly are best seen in FIGS. 19-24, wherein a metallic drive gear 110 includes an enlarged flat head 112 carrying an axially projecting face-type bevel gear 114 having a plurality of circumferentially spaced generally narrow teeth 116. Extending in the opposite direction from the flat radially extending side is a stub shaft 118 terminating in drive impressions, such as external drive 120 and internal drive 122, the preferred configuration following the teachings of the drive impressions bearing the Registered Trademark "Torx". This narrow tooth gear 114 is preferably metallic in nature to provide a balanced strength between the two gears. A preferred form is a die-cast zinc alloy product, however, other manufacturing techniques can be utilized where economically feasible.

The adjustment gear 130, on the other hand, is a one-piece injection molded plastic device having an intermediate radially extending flat head 132 positioned around and intermediate the ends of an integral tubular or hollow sleeve nut 134. Head 132 is adapted to seat against rigid wall 42. Nut 134 may have one or more bores having the same or differing diameters, as shown at 136 and 138. At the end having the reduced diameter 138, there can, if desired, be provided tool engaging means in the form of spanner wrench slots 140. Extending in the opposite direction from head 132 are tightly spaced circumferentially enlarged teeth 142, having an interdental spacing adequate to accept the narrow teeth 116 of the drive gear 114. These enlarged plastic teeth 142 provide teeth having adequate shear strength to withstand the torque applied by the narrower metallic teeth of gear 114. This balancing of tooth strengths provides an adjustment means capable of delivering the impact torques necessary to actuate headlight units of the type contemplated, even when the headlight units have been subjected to infusion of pollution and debris normally encountered by forward ends of automobiles.

The plastic sleeve nut 134 enlarged bore 136 is preferably equal to or slightly greater than the major diameter of the adjustment screw 16, while diameter of smaller bore 138 is preferably equal to the diametral pitch of screw 16 and can be either pre-threaded or capable of being thread formed by screw 16. In either event the nut 134 should provide a prevailing torque when associated with screw 16 to insure little or no backlash when nut 134 is rotated by torque being applied through gear 142 and screw 16 being held against rotation by ribs 22 captured in fixed grommet 18 in the headlamp assembly 12 to provide a linear movement to screw 16.

Figure 8:
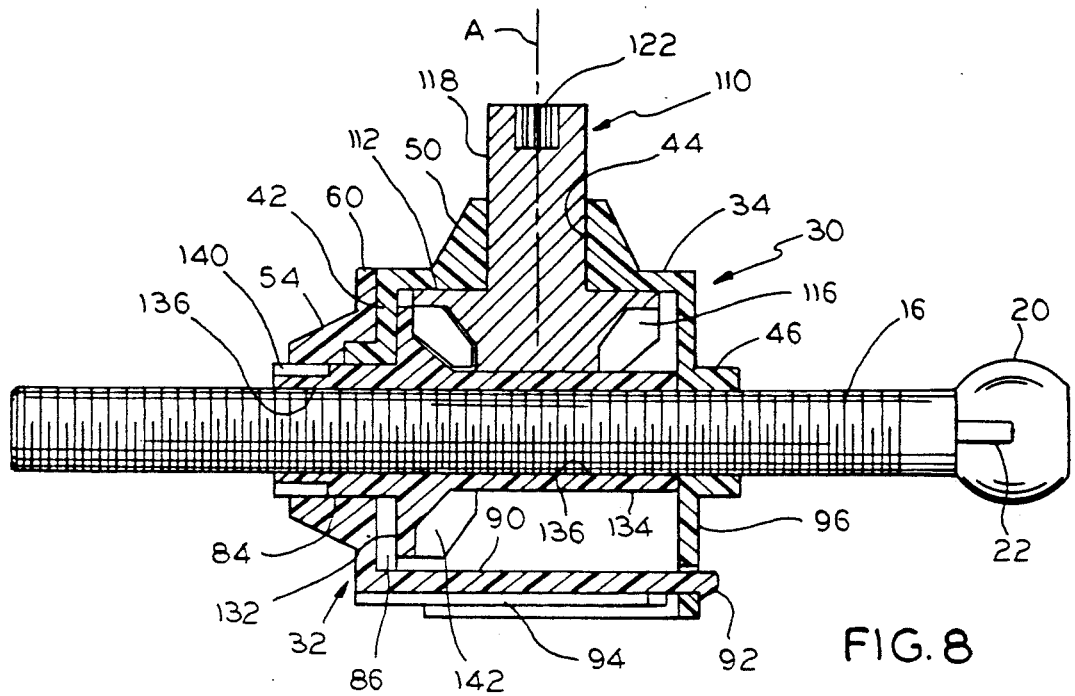
FIG. 8 is a vertical sectional view taken along line 8—8 in FIG. 4.

In the manufacture of this precision adjustment device 10, the drive gear unit 110 has its stub shaft 118 introduced into bore 44 until head 112 bears firmly against the inner surface of end wall 34 of main body portion 30. The drive means 140 end portion of the sleeve nut 134 is eased into the bearing 54 with the teeth 116 of gear 114 meshing with teeth 142 of gear 130. The cover or back 32 is slid into assembled relation with the free edges 102 of the semi-cylindrical portion 62 being aligned wit and contacting the ridge lines 100 of the segmented cylindrical portion 54 of the main body portion 30. Portion 54 is slidably accepted within recess 82. With the axially extending pins 70 being located in blind bores 72 and the tab with locking hook 92 passing through slot 56 and snapping over the outside surface of reinforcing portion 96, the two piece housing is complete. Gear head 132 is brought to bear against the flat adjoining wall 42 and saddle 84 supporting the sleeve nut 134 causes the nut 134 to be properly aligned with bore 43 in bearing 46, whereby adjusting screw 16 can be freely introduced into bore 43 and telescoped through the enlarged tube nut bore 136 until it encounters the reduced diameter bore 138. The bore 138 can be either threaded or unthreaded and the screw 16 when rotated by appropriate means such as engaging ribs 22 or impression 26 in its head 20 will engage or cut threads in bore 138 and thereby position the screw 16 in predetermined axial relation to the adjustment means 10, as shown in FIGS. 1, 2, and 8. Conversely, the tube nut 134 can be rotated by its exposed spanner-type drive means 140 or rotated by drive gear 110 to bring about the assembly with screw 16, while the latter is held against rotation by ribs 22 or impression 26.

Thus, when the adjustment means 10 is assembled with the headlamp housing 12, suitable elongated drive means 150 having either an external or an internal Torx (trademark) impression 152 at its lower end is brought into engagement with external impression 120 or internal impression 122 in the end of stub shaft 118. Elongated means 150 also includes drive means 154, in the form of a head or an impression, at its upper free end for engagement by an operator during the adjustment operation. The length of drive means 150 is optional for differing models and if lost the Torx impression 122 in the end of stub shaft 118 is adapted to accept regular standard Torx tools for adjusting purposes.

This unique design that provides the rigid nature of the assembled body 10, formed from main portion 30 and press-fit slide snap closure 32, insures proper orientation and maintenance of gears 114 and 142 by the rigid nature of the main body portion 30 which will maintain its designed configuration and its ability to absorb any shock generated by the mating gears in the rigid corner defined by upper end wall 34 and the adjacent wall 42; and the reinforced bearings 43, 44, and 54. This simplification of the housing assembly reduces the overall cost of assembly and improves quality without sacrificing gear strength and performance thereby bringing about a safe solid adjustment means for headlamp adjustment under the hood or bonnet of the vehicle with which it is associated. While other configurations may be apparent to those skilled in the art, it is my intent that I be limited only by the attached claims, wherein

I claim:

1. An improved angular adjusting mechanism for a headlamp or a like assembly including a molded gear housing having a substantially rigid two piece press fit assembly, at least two angularly disposed intersecting axes bores disposed in spaced relation in sidewalls of said assembly, an integral drive shaft and drive gear means, said drive shaft journaled in and projecting outwardly of one of said sidewall bores with said integral drive gear means projecting in the opposite direction within said housing while bearing on said one sidewall adjacent said bore, a one-piece tubular nut and adjusting gear means journaled at one end in a second sidewall bore with said adjusting gear means engaging said drive gear means internally of said housing, adjusting means carried by said tubular nut and having means for providing axial movement of said adjusting means when said tubular nut is rotated.

2. An adjusting mechanism as claimed in claim 1 wherein said adjusting means is rotationally fixed but axially adjustable.

3. An adjusting mechanism as claimed in claim 2 wherein said adjusting means is externally threaded along a substantial portion of its length.

4. An adjusting mechanism as claimed in claim 3 wherein said adjusting gear means and said drive gear means are both generally bevel gear means.

5. An adjusting mechanism as claimed in claim 4 wherein one of said gear means is formed of metallic material and the other gear means is formed of plastic material.

6. An adjusting mechanism as claimed in claim 5 wherein the teeth on said respective gear means are designed to be of balanced shear strength.

7. An adjusting mechanism as claimed in claim 6 wherein the teeth on said metallic material gear are substantially narrower than the teeth on said plastic material gear but are substantially fully mateable.

8. An adjusting mechanism as claimed in claim 7 wherein said drive gear is formed of metallic material and said adjusting means gear is formed of plastic material.

9. An adjusting mechanism as claimed in claim 3 wherein said gear housing includes a third sidewall bore coaxially disposed opposite said second sidewall bore and adapted to accept said adjusting means for axial movement therethrough.

10. An adjusting mechanism as claimed in claim 9 wherein said adjusting means is generally cylindrical and includes thread means along a substantial portion of its axial length.

11. An adjusting mechanism as claimed in claim 10 wherein said adjusting means includes enlarged head means at one extremity thereof.

12. An adjusting mechanism as claimed in claim 11 wherein said head means includes driving means for rotation thereof as well as said adjusting means.

13. An adjusting mechanism as claimed in claim 11 wherein said enlarged head means includes means for preventing rotation of said adjusting means during rotation of said tubular nut and adjusting gear means but permitting axial movement thereof relative to said housing.

14. An adjusting mechanism as claimed in claim 13 wherein said headlamp or like assembly includes socket-like means adapted to accept and retain said enlarged head, said enlarged head including means for preventing rotation thereof when associated with said socket-like means.

15. An adjusting mechanism as claimed in claim 14 wherein said rotation preventing means includes axially disposed rib means for cooperative anti-rotation engagement with complimentary slot means in said socket-like means.

16. An adjusting mechanism as claimed in claim 15 wherein said tubular nut means extends in opposite directions from its integral juncture with said adjusting gear means, it extends through said second sidewall bore and exposes means carried thereon for inducing and/or preventing rotation of said nut means during telescopic introduction of said adjusting means therethrough.

17. An adjusting mechanism as claimed in claim 16 wherein said adjusting means is a threaded rod having a predetermined diameter, said tubular nut means includes a plurality of internal diameters in its through bore, at least one of which is substantially less than said predetermined diameter.

18. An adjusting mechanism as claimed in claim 17 wherein said lesser diameter is approximately equal to the pitch diameter of said threaded rod, said rod being harder than and capable of imposing its thread configuration in said tubular nut.

19. An adjusting mechanism as claimed in claim 18 wherein said tubular nut is fabricated of a thermoplastic and said threaded rod is metallic in nature.

20. An improved housing for an angular adjusting mechanism, said housing having a substantially rigid two piece press fit assembly, the first piece of said assembly being an integral box-like housing having opposed generally flat sidewalls having a predetermined height, said sidewalls taper in curving fashion along one edge to connect with a reduced width end wall having an aperture therethrough, an opposite integral partial flat end wall extending between and connecting the opposite flat edge of said opposed sidewalls, a substantially flat top end integrally interconnecting both the flat and curving portions of said side walls as well as said two end walls, a central through bore in said top end, a partial U-shaped open-sided frusto-cylindrical bearing means extending axially outwardly from said partial flat end wall and said open-side opening through the free edge of said end wall away from said interconnecting flat top end, said partial bearing means being coaxial with said aperture through said narrow end wall, said first piece thereby forming an open ended box-like structure having a generally square cross-sectional configuration with said sidewalls being curved inwardly toward said narrow end wall at one edge thereof, the flat portion of said sidewalls being reinforced on the exterior thereof, the second piece of said assembly including a substantially flat bottom end member adapted to close the open end by providing means for engaging the free ends of said two opposing sidewall members and the reduced width end wall, an upstanding wall along one edge of said flat bottom end member including a through bore capable of embracing and accepting said frusto-cylindrical partial bearing means of said first piece to form a complete cylindrical bearing coaxial to the aperture in said reduced width end wall, means for reinforcing the rigidity of said upstanding wall and adapted to complete said partial flat end wall, and locking means for locking said second piece in assembled relation to said first piece.

21. An improved housing of the type claimed in claim 20 in combination with the following elements, a drive shaft carrying an integral drive gear, said drive shaft being accepted within said central through bore in said top end, said drive gear being adapted to seat upon and move over the inner surface of said top end, said drive gear being generally restrained radially by said tapered curving side walls, an integral tubular nut and adjusting gear, said gear being positioned intermediate the extremities of said nut, said tubular nut including drive means at one end thereof, said one end being adapted to be journaled in said reinforced frusto-cylindrical bearing means and to expose said drive means at the open end extremity thereof, said adjustment gear being adapted to seat upon said reinforced partial flat end wall and to mesh complimentarily with said drive gear, said reduced width end wall being radially inset at its juncture with said curving sidewalls to form a notch-like configuration and thereby provide a pair of narrow lateral support walls for the opposite end of said tubular nut to engage and thereby prevent lateral misalignment of said tubular nut from its co-axial positionment relative to the said co-axially disposed bearing and said aperture found in said opposite end walls.

22. An improved housing and combination as claimed in claim 21 wherein said partial bearing is reinforced by a complimentary cavity in said upstanding wall adapted to accept the free end of said frusto-cylindrical bearing means, yoke-like reinforcing legs supporting a complimentary partial bearing means extending upwardly from said flat bottom end member of said second piece towards said complimentary cavity to complete the missing portion in said frusto-cylindrical partial bearing means in said first piece.

23. An improved housing and combination as claimed in claim 21 wherein the reinforcement of said flat sidewalls includes a relatively thick laterally extending rib means having at least one through bore for acceptance of at least one fastener for mounting of said housing and its combination relative to a workpiece, said rib means also including at least one secondary bore, said upstanding wall of said second piece including a relatively thinner laterally extending rib means generally complimentary to said relatively thick rib means and including at least one fixed peg means for complimentary acceptance by said at least one secondary bore means to insure positive alignment of said two pieces when said pieces are slid together until said ribs are in juxtaposed relation with said peg means telescoped into said secondary bore means to form said rigid housing assembly.

24. An improved housing as claimed in claim 20 wherein said flat bottom end member includes a flat element adapted to engage the inner surface of said side and narrow end walls along a line falling immediately adjacent to a plane passing through the free ends of said side and narrow end walls, a laterally extending peripheral flange means integral with said flat element and adapted to engage said free ends to thereby close said open bottom end of said first piece.

25. An improved housing as claimed in claim 24 wherein said narrow end wall includes an axial extension along the open end of said first piece and having an aperture passing through said extension.

26. An improved housing as claimed in claim 25 wherein said flat bottom end member includes locking means extending from its free end opposite the upstanding wall and adapted to cooperate with said apertured extension to lock said second piece relative to said first piece.

27. An improved angular adjusting mechanism including a substantially rigid two piece manually slidably assemblable press fit housing having appropriate inner surfaces and intersecting bearing bores to accommodate and cooperate with an integral metallic drive shaft and drive gear, an integral plastic tubular nut and adjustment gear, and a threaded adjustment rod cooperatively accepted within said tubular nut, said rod including means for restraining rotation thereof whereby rotation of said drive shaft will cause said drive gear to drive said adjustment gear for rotation of said tubular nut resulting in axial movement of said adjustment rod without rotation thereof.

28. An improved adjusting mechanism as claimed in claim 27 wherein said metallic drive gear and said plastic adjustment gear have tooth shear strengths that are mutually compatible.

29. An improved adjusting mechanism as claimed in claim 28 wherein said metallic drive gear has teeth thereon that are substantially thinner than the teeth on said plastic adjustment gear.

30. An improved adjusting mechanism as claimed in claim 29 wherein said drive shaft and said tubular nut both include means for causing rotation as well as restraint of rotation.

* * * * *